United States Patent [19]
Lapyere et al.

[11] Patent Number: 5,507,383
[45] Date of Patent: Apr. 16, 1996

[54] HIGH FRICTION PLASTIC CONVEYOR BELTS HAVING MODULAR LINKS FORMED BY TWO INTEGRATED PLASTIC MATERIALS

[75] Inventors: Robert S. Lapyere, New Orleans; John J. Carbone, Metairie, both of La.

[73] Assignee: The Laitram Corporation, Harahan, La.

[21] Appl. No.: 327,999

[22] Filed: Oct. 24, 1994

Related U.S. Application Data

[63] Continuation-in-part of Ser. No. 153,979, Nov. 18, 1993, Pat. No. 5,361,893.

[51] Int. Cl.$^6$ .................................................. B65G 17/06
[52] U.S. Cl. ............................................................. 198/853
[58] Field of Search ................................... 198/850, 851, 198/852, 853, 690.2

[56] References Cited

U.S. PATENT DOCUMENTS

| | | | |
|---|---|---|---|
| 1,794,182 | 2/1931 | Kunz | 198/853 |
| 2,784,835 | 3/1957 | Dixon | 198/690.2 |
| 2,792,928 | 5/1957 | Holz | 198/853 |
| 2,909,271 | 10/1959 | Taylor | 198/690.2 |
| 3,046,806 | 7/1962 | Collins | 198/853 X |
| 3,123,202 | 3/1964 | Stevens | 198/853 |
| 3,857,478 | 12/1974 | Meeusen . | |
| 4,925,013 | 5/1990 | Lapeyre | 198/698 |
| 4,953,693 | 9/1990 | Draebel | 198/853 |
| 5,323,893 | 6/1994 | Garbagnati | 198/690.2 |
| 5,361,893 | 11/1994 | Lapeyre et al. | 198/853 |
| 5,377,819 | 1/1995 | Horton et al. | 198/853 |

FOREIGN PATENT DOCUMENTS

| | | | |
|---|---|---|---|
| 1437166 | 5/1976 | United Kingdom | 198/853 |
| 2185725 | 7/1987 | United Kingdom . | |

*Primary Examiner*—James R. Bidwell
*Attorney, Agent, or Firm*—Laurence R. Brown; James T. Cronvich

[57] ABSTRACT

A plastic conveyor belt system provides high frictional surface contact between the conveyor work surface and the load carried by the conveyor. This is achieved by modular belt links integrally formed of two diverse plastic materials such as a low friction polypropylene and a high friction elastomer thermoplastic rubber. Typically a belt modular link having a planar load support area disposed in its lower forming mold piece with an upper mold piece removed to expose the planar area. Then a further mold piece is mated with the lower mold piece to integrally join by thermal bonding the two diverse materials producing on the planar link load bearing surface area an elastomer strip with an outer frictional load surface for encountering the belt load and resiliently conforming with the load for conveyance in incline and decline conveyor patterns, for example. Special belt patterns such as extending tooth-like appendages on the outer resilient surface layers provide specific advantages of belt operation.

13 Claims, 3 Drawing Sheets

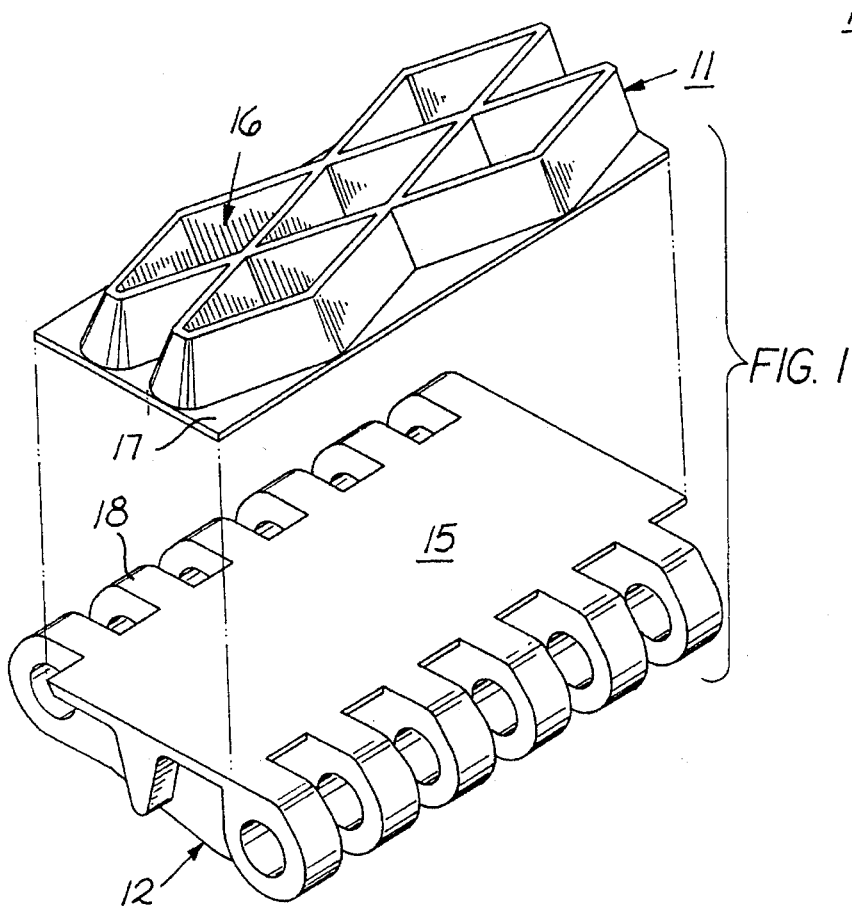
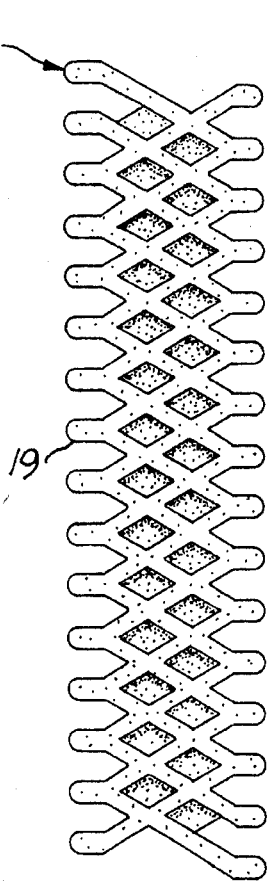
FIG. 1
FIG. 2
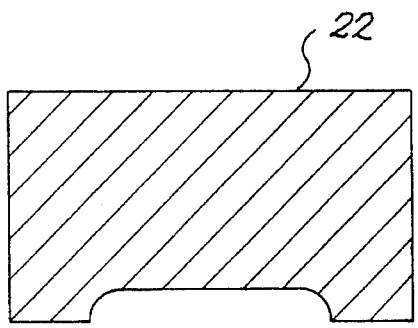
FIG. 4
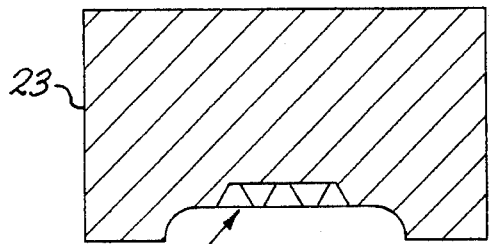
FIG. 5
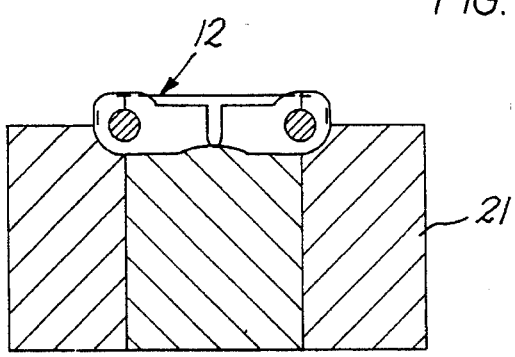
FIG. 3

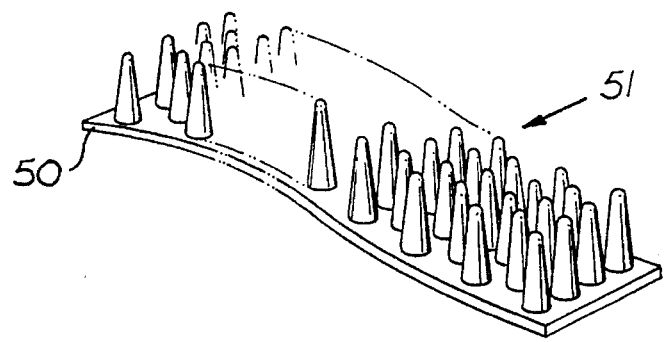
FIG. 9
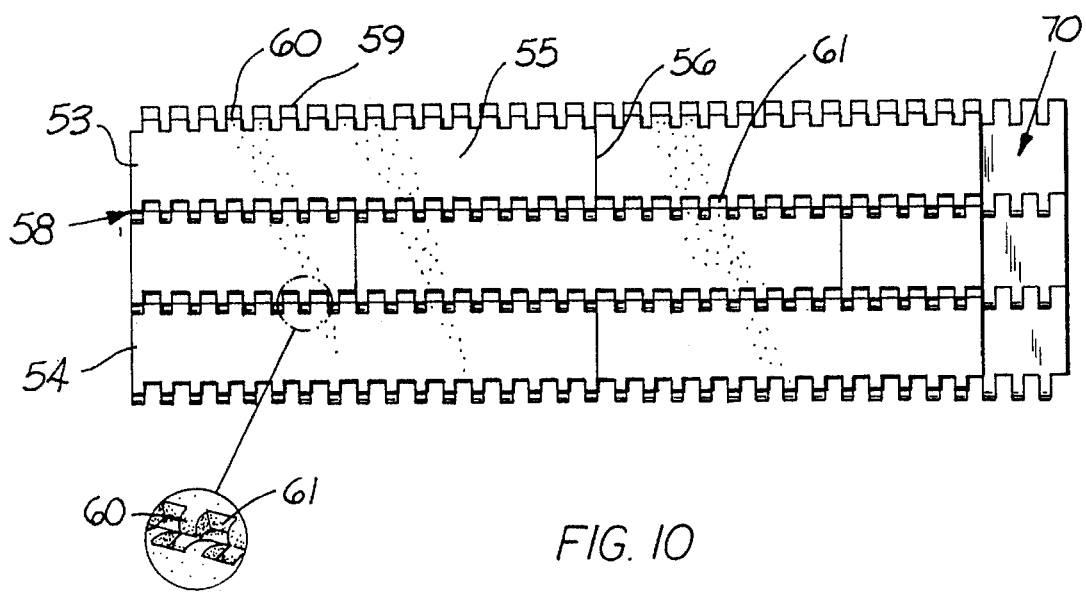
FIG. 10
FIG. 10A
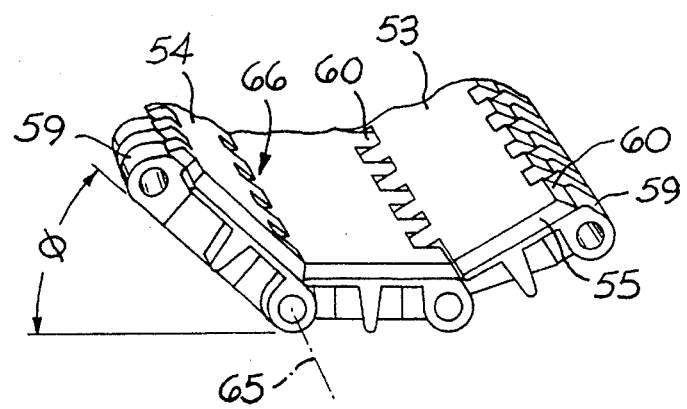
FIG. 11

5,507,383

HIGH FRICTION PLASTIC CONVEYOR BELTS HAVING MODULAR LINKS FORMED BY TWO INTEGRATED PLASTIC MATERIALS

This is a continuation-in-part of the application Ser. No. 08/153,979 filed Nov. 18, 1993 U.S. Pat. No. 5,361,893.

TECHNICAL FIELD

This invention relates to plastic modular conveyor belts and more particularly it relates to conveyor belts with plastic modular links integrally formed of two different plastic or rubber materials.

BACKGROUND ART

Modular plastic links for conveyors are typically formed of polyethylene, polypropylene or acetal, which are hard, wear resistant plastics having a low coefficient of friction ideal for pivoting the links and frictional contact with wear strip surfaces. These plastics also provide a high tensile strength along the belt for conveying heavy loads and ideal chemical and biological inactivity for use of the belts in sanitary and chemical environments. However, the low friction characteristics of the plastics do not form an ideal belt-to-load surface for carrying loads up and down inclines.

In the prior art, fabric and rubber-like belts have been used extensively to increase the friction of the carrying surface of the belts. However, these belts have certain shortcomings. Because significant friction between a fabric belt and its driving drum is required to effectively drive the belt, fabric belts are maintained in high tension, even while not operating. The high tension stretches the belt and strains the conveyor frame and tensioner. Another shortcoming with fabric belts is that they are not positively tracked, making them susceptible to edge damage as the untracked belt wanders from side to side. Repair is another problem with fabric belts. Removing worn sections, inserting splices, determining the correct length, and reinstalling and retensioning the repaired belt can be difficult. Furthermore, the roller carryways used with fabric belts are noisy.

It is therefore a primary object of this invention to resolve these problems by manufacture of high friction link belt modules and to provide improved high friction conveyor belts and conveyor systems.

DISCLOSURE OF THE INVENTION

In accordance with this invention modular plastic link belts are made with high friction surfaces by providing integral modular links bonding together two different plastic or rubber materials. One material, typically an elastomer such as a thermoplastic rubber is disposed on the load transport surface to provide a high friction transport surface. The other material, typically acetal, polypropylene or polyethylene, forms a module with link ends for receiving pivot rods for coupling modules together end-to-end in a low friction, high strength, rigid belt assembly of fixed length for driving by sprocket wheel assemblies. The materials are thermally bonded by molding to form unitary modular link elements with a high friction load transport surface.

Further objects, features and advantages of the invention will be found throughout the following description, drawings and claims.

BRIEF DESCRIPTION OF THE DRAWINGS:

In the accompanying drawings, wherein like reference characters refer to similar features throughout the various views to facilitate comparison:

FIG. 1 is an exploded perspective sketch of a modular belt link afforded by this invention having an integral body formed of two different materials, respectively characterized by low and high coefficients of friction;

FIG. 2 is a plan view of a high friction textured overlay pattern for forming a load carrying surface of a conveyor belt;

FIGS. 3 to 5 are respectively section sketches of a lower and two alternating upper mold pieces employed to integrally mold a modular belt link from two different materials in accordance with this invention;

FIG. 9 is a perspective fragmental view of a high friction layer having a bed of teeth pointed outwardly from a belt surface to receive and resiliently conform with the shape of an object being transported on the belt;

FIG. 10 is a plan view of the load bearing surface on a length of conveyor belt constructed of bricklayered links formed with an integral surface layer of soft rubber-like resilient plastic material bonded on the load bearing surfaces of hard plastic links; and FIG. 11 is a perspective end view of a belt fragment of FIG. 10 showing the high friction surface material pattern with a gap between interdigitated appendages to permit a degree of backward articulation of the belt.

THE PREFERRED EMBODIMENTS

Figure 6:
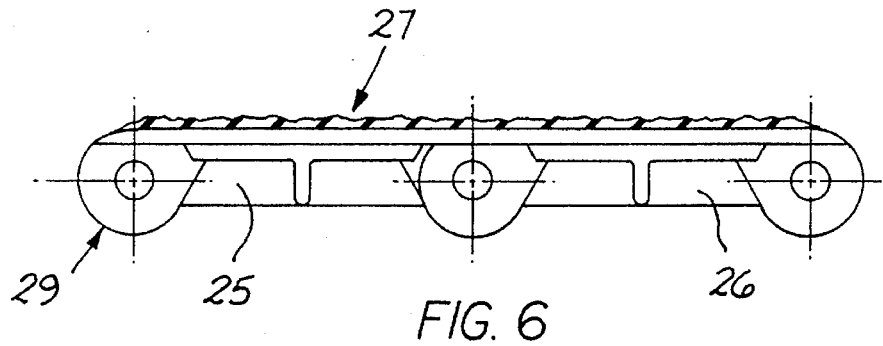
FIG. 6 is a side view sketch, partly in section, showing a fragment of a modular link belt with modular links pivoted together.

The modular link of FIG. 1 has the anti-skid conveyor load carrying surface member 11 and the link end carrying base member 12 formed of two separate materials bonded together integrally at the top surface interface 15. For functionally adapting the modular link element to resolve the aforesaid problems of the prior art, the base element 12 is formed of a strong, hard plastic material having a low coefficient of friction, typically acetal, polypropylene or polyethylene, and the surface member 11 is of an elastomer, typically a thermoplastic rubber having a high coefficient of friction. The elements are bonded together at the interface surface 15 preferably by thermal injection molding.

The surface friction member 11 in one embodiment is textured to present an anti-slip high friction load carrying surface having diamond shaped ridges 16 extending upwardly from an unapertured carrying surface strip 17. When the friction member 11 is superimposed on the flat-top surface 15 of the base elements 12 connected pivotably end to end, there will be a gap between the strips 17 extending over the link ends 18 of the base elements 12.

However, the textured surface of the modified friction member 11' in FIG. 2 provides mating link end members 19 that will overlap and interdigitate with the link ends 18 to form a substantially continuous load bearing anti-slip surface over the length of the belt.

It should be appreciated that, although the embodiments shown have flat-top surfaces, it is also possible to have perforated or otherwise open-area belt modules for drainage or air flow.

The integral modular links are molded in the manner represented by the mold pieces shown in FIGS. 3, 4 and 5. Thus the base member 12 resides in the lower mold half 21 after the upper die half 22 has been removed. Then the alternating die half 23 is mated with lower die 21 to thermally bond the surface member 11 to the flat upper surface of link 12, preferably by injection molding.

Figure 7:
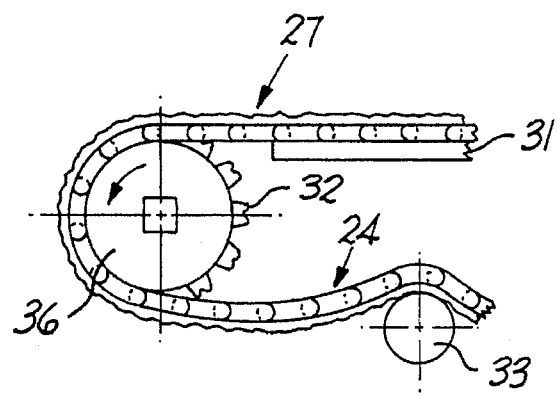
FIG. 7 is a fragmentary side view sketch of a sprocket driven conveyor belt system embodying the invention.

Belt systems constructed with interconnected finished modular links 25, 26, as shown in FIG. 6, representing a fragmental portion of a pivoted link conveyor belt 24 in FIG. 7, thus present an anti-slip upper load bearing transport surface 27 formed of the high friction material, and a lower link base of stronger and longer wearing hard plastic having lower friction. The low friction material of the base member 12 at the pivot zones 29 is crucial, as is the low friction interface at the wear plates 31 of the conveyor belt array of FIG. 7. Also the low friction interface of the sprocket teeth 32 with the hard plastic low friction material is crucial to belt wear and permits the use of more positive sprocket drive to replace rollers that were used heretofore with fabric belts necessary to provide high friction load carrying interfaces.

Since the softer resilient elastomeric material of the anti-slip surface 27 is more subject to wear, the lowermost return path of the link belt is passed over small diameter rollers 33 in embodiments where there must be contact with the high friction material. The resulting conveyor link belt system is not compromised in terms of pulling capacity or tensile strength with the construction of links as taught by this invention.

Figure 8:
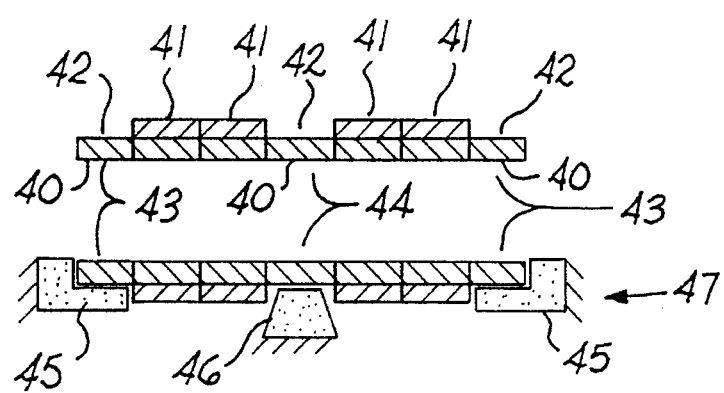
FIG. 8 is a cross-sectional elevational view of a conveyor embodying the invention showing an upper carryway and a lower returnway with the belt supported by wear strips in contact with low friction surface portions.

Another advantage of the modularity of the invention is that various patterns of high-friction surfaces can be arranged in constructing a conveyor belt. For example, as shown in FIG. 8, belt modules 40 lacking high-friction conveying surfaces can be bricklayed with modules 41 having high-friction surfaces in a load-bearing surface pattern characterized by low-friction bands 42 along the edges 43 or internal portions 44 of the belt. Stationary wearstrips 45 or shoes 46, rather than the moving roller 33 of FIG. 7, can be positioned along the return path 47 in line with the low-friction bands 42 to minimize friction and wear. Equivalently, modules can be molded with longitudinal gaps between high-friction surface material so that a conveyor belt having low-friction longitudinal bands along the load-bearing side can be assembled.

A further significant advantage of this invention is the ease of repair of modular link belts simply by module replacement, which replaces the prior art practice of making of incompatible joints to connect ends of fabric belts together. The design of proper link belts is facilitated by the link construction, and the hard plastic is not subject to any extensive stretching or fatigue.

It is noted that with the shown construction the high friction material is not required to bend as it articulates about the sprocket assembly 36 of FIG. 7. Thus this system is superior to a drum drive fabric belt system, or any system superimposing a non-modular surface material along the length of a modular belt system.

This invention therefore provides in one embodiment a modular link for a plastic conveyor belt adapted to convey loads up and down inclined surfaces by way of a thermally bonded surface member 11 affixed unitarily to a basic modular link to serve as a high friction load transport body.

Thus, surface member 11 is made of high friction elastomeric material that thermally bonds to form a unitary modular link with the basic plastic modular link body of base member 12. Thus a basic modular link formed of hard, wear resistant plastic material having a low coefficient of friction with a shape presenting a load carrying surface with a substantially planar load bearing area 15 is converted into a high friction modular link capable of carrying loads up and down an inclined surface. The hard plastic region serving as interface surface 15 forms a thermal bond with dissimilar compressible thermoplastic frictional materials to produce a unitary modular conveyor belt link of different load bearing characteristics. These links when coupled end-to-end form a belt of predeterminable fixed length that retains high longitudinal belt strength and low friction contact surfaces for belt transport bearing surfaces and pivot joints. Improved conveyor belt systems using these modules function over a wide range of loading requirements including transport up and down inclined surfaces.

The high friction load transport body encompasses substantially the entire load bearing area of the modular links to produce maximum load support, friction and bonding strength. A textured surface (FIGS. 1, 2) extending outwardly from the surface of the high friction material in a set of interconnected ridges will conform resiliently to load bodies in contact therewith for additional functional advantage in conveying different types of loads. The load transport body in the embodiment of FIG. 2 has interdigitatable link end fingers extending from the main body of high friction material to overlap the link end fingers 18 on the basic module (FIG. 1).

The high friction material does not interfere with the favorable drive characteristics of the low friction hard plastic of the basic modular link structure, and therefore serves advantageously with sprocket drive gear transport of the belt. That is, there is no particular forces on the large thermoplastic bonded area that tends to disrupt the unity of the load bearing modular unit, since the load offers basically a downward compression with little shear force that would tend to cause catastrophic failure. Furthermore, the placement of the two diverse materials in the modular link conveyor belts of this invention is such that the hard plastic material is used to contact frictionally wear strips with minimal friction.

In particular, this invention provides two compatible modular links which may be bricklayed in a conveyor belt of desired width to provide separate lanes of either modules with high friction load bearing surfaces to transport loads or with low friction long lasting plastic surfaces that mate with wear strips, typically installed on belt return paths, which would otherwise interfere with high friction surfaces on the load bearing surfaces unitary modules formed from diverse materials supplied by this invention.

The FIG. 9 embodiment of the surface layer 50 to be bonded upon the hard plastic link load bearing surface has a bed of teeth 51 extending vertically outwardly from the belt surface. The individual teeth in the bed 51, for example, one-quarter inch long and the tooth density is about forty per square inch. This constitutes an ideal surface configuration for transporting fruit such as peaches when supplied with very soft resilient teeth that are not stiff enough to penetrate or damage the fruit.

The belt configuration of FIGS. 10 and 11 shows the bricklayering of seven links 53, 54, etc. separated at seams 56 to form a predetermined belt width wider than a single link. The bonded integral high friction layers have a horizontally disposed tooth pattern 58 with individual teeth 59 extending over the link ends 60 in a zig-zag pattern that simulates saw teeth, for example. The teeth 59 on adjacent end-to-end pivotably connected links are interdigitated and preferably overlap to form substantially a continuous end-to-end frictional surface along the length of the belt.

There is purposely left a gap 61 between the surface layers on two end-to-end connected links of a horizontally extending belt surface in order to permit more freedom of articulation of the links in the belt path about the pivot axes 65. Thus, as seen in FIG. 11, there is a limited degree of backward articulation over the angle φ permitted before the teeth 59 abut the notches 66 of this rectangular sawtooth surface pattern of surface layer 55. Thus the toothed appendages 59 and accompanying notches 66 form a substantially rectangular zig-zag pattern substantially parallel to a pivot axis through the link ends. This is necessary to permit the belt to react without binding under conditions for example encountered as it backflexes on its approach to support surfaces on the returnway path.

There is provided in this embodiment, as shown in FIG. 10, a longitudinally disposed lane 70 devoid of the surface layer 55 which permits the use of a wearplate or similar function support member for the belt riding in frictional contact with the hard plastic low friction link surfaces shown at the right end of the belt. However for the rest of the belt width, the load bearing surface of the belt which is co-planar with the aperture carrying link ends is substantially fully covered by the soft resilient high-friction material, and thus overlaps a significant part of the interdigitated link end fingers 60 on ajacent end-to-end links extending from and coplanar with the load bearing surface.

Having therefore advanced the state of the art, those novel features believed descriptive of the nature and spirit of the invention are defined with particularity in the following claims.

We claim:

1. An integrally bonded modular link for an endless plastic conveyor belt with interdigitated link end fingers for forming pivot joints, said link being formed with a first part facing inwardly of a hard wear resistant plastic material providing a low coefficient of friction, said link having a load bearing surface, and a second part facing outwardly from the load bearing surface made of a soft resilient rubber-like plastic outer surface material having a high coefficient of friction and formed with a plurality of appendages extending vertically therefrom, said resilient material being thermally bondable to the first part and being thermally bonded directly to the load bearing surface thereby forming an integral link for frictionally engaging a load carried by the belt.

2. An integrally bonded modular link for an endless plastic conveyor belt system with interdigitated link end fingers for forming pivot joints, said link being formed with a first part facing inwardly of a hard wear resistant plastic material providing a low coefficient of friction and a second part facing outwardly on a load bearing surface made of an integrally bonded soft resilient rubber-like plastic outer surface material having a high coefficient of friction and formed with a plurality of tooth-like appendages positioned on the load bearing surface to frictionally engage a load carried by the belt wherein said appendages extend horizontally along the load bearing surface to produce saw-tooth like leading and trailing edges.

3. The link of claim 2 wherein said appendages are bonded to overlap the link end fingers.

4. The link of claim 3 wherein said appendages are positioned to interdigitate with and overlap appendages on adjacent end-to-end coupled links.

5. The link of claim 2 wherein said appendages form a substantially rectangular zig-zag pattern substantially parallel to a pivot axis through the link ends.

6. The link of claim 4 wherein the interdigitated appendages of high friction material on adjacent end-to-end coupled links are spaced with a gap to permit articulation of links toward the load bearing surface.

7. The link of claim 2 wherein said second part comprises a bed of closely spaced teeth extending outwardly at least one-quarter inch and wherein said outer surface material is soft enough to bend and provide a nest in the presence of small sized fragile load objects such as fruits without penetration and damage.

8. The link of claim 7 wherein the teeth in said bed have a tooth density of the order of forty per square inch.

9. An integrally bonded modular link for an endless plastic conveyor belt with interdigitated link end fingers for forming pivot joints, said link being formed with a first part facing inwardly of a hard wear resistant plastic material providing a low coefficient of friction, said link having a load bearing surface, and a second part facing outwardly from the load bearing surface made of a soft resilient rubber-like plastic outer surface material having a high coefficient of friction thermally bondable to the first part and being thermally bonded directly to the load bearing surface thereby forming an integral link for frictionally engaging a load carried by the belt with modular link being connected in said conveyor belt system by the interdigitated link end fingers with further links formed of at least said low friction plastic material with the links disposed in a bricklayered pattern of side by side links having between-link seams offset to meet at an intermediate position between leading and trailing links thereby to form a belt of predetermined width.

10. The conveyor belt system of claim 9 wherein said high friction surface material is distributed partly over the belt width to form at least one longitudinal lane on the belt surface without the high friction surface material.

11. The conveyor belt system of claim 10 wherein a wear plate is in frictional contact with the belt lane surface without the high friction surface material.

12. A modular link plastic conveyor belt system, comprising in combination:

a plurality of links made of low friction hard plastic material coupled end-to-end for articulation along a pivot axis defined by apertures in interdigitated link end fingers on adjacent end-to-end links extending from and coplanar with a load bearing surface in a belt of predetermined length and width, and a high friction surface layer of rubber-like plastic bonded in a pattern covering substantially the entire surface of a load carrying surface of the links except for at least one longitudinal lane along the belt surface devoid of the high friction surface layer for thus permitting low friction contact with a belt support member.

13. An integrally bonded modular link of two compatible plastic materials that integrally bond together for coupling in an endless plastic conveyor belt, said link comprising in combination, interdigitated link end fingers with journalling aperture means for forming pivot joints connecting links together with cylindrical pivot rods into a conveyor belt configuration, a first part of a hard wear-resistant plastic material providing a low coefficient of friction carrying said link end fingers with a substantially planar flat load bearing surface facing outwardly in the conveyor belt, and a second part comprising a yieldable material with high coefficient of friction bonded integrally to the flat load bearing surface and forming an integral link therewith for frictionally engaging loads carried by said conveyor belt.

* * * * *